United States Patent Office 3,325,765
Patented June 13, 1967

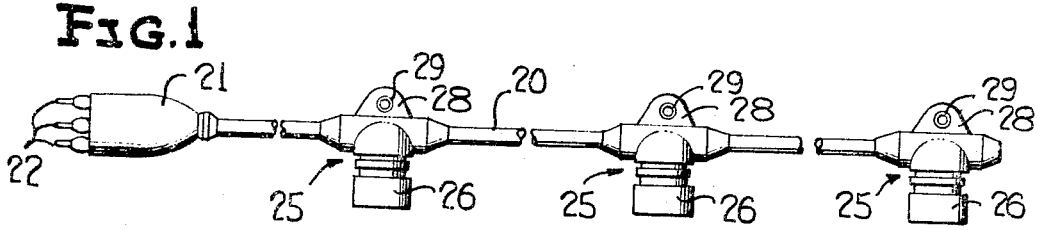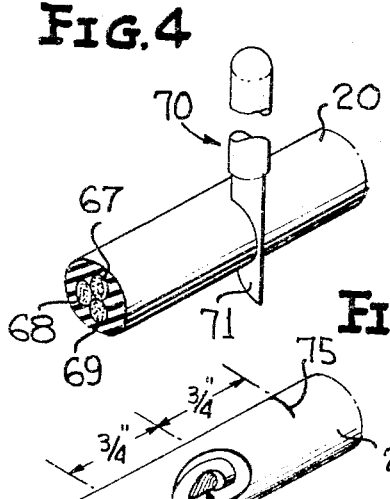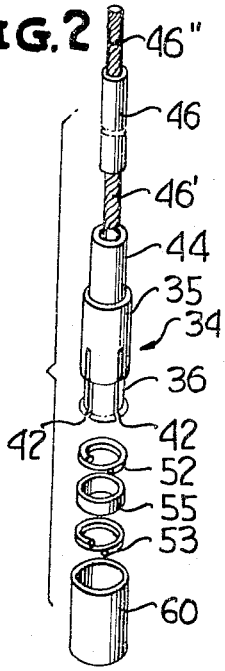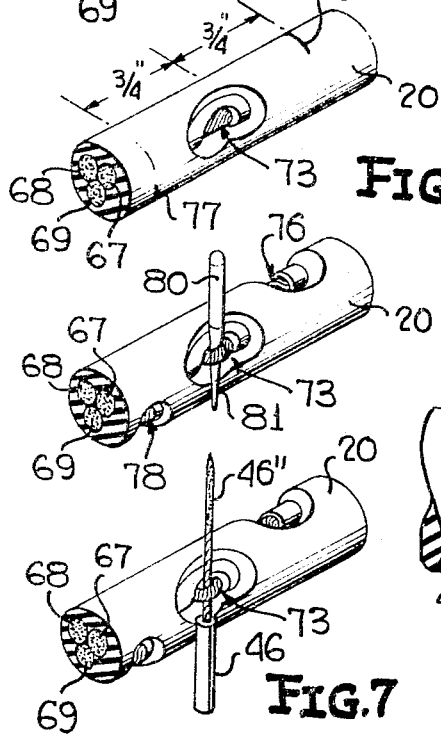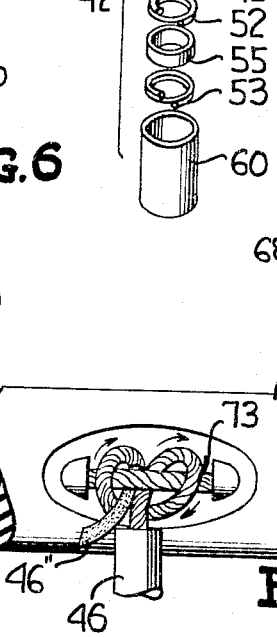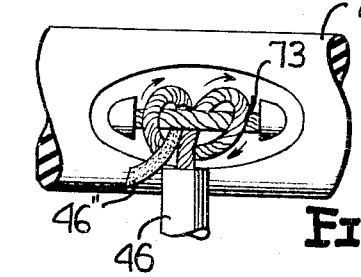

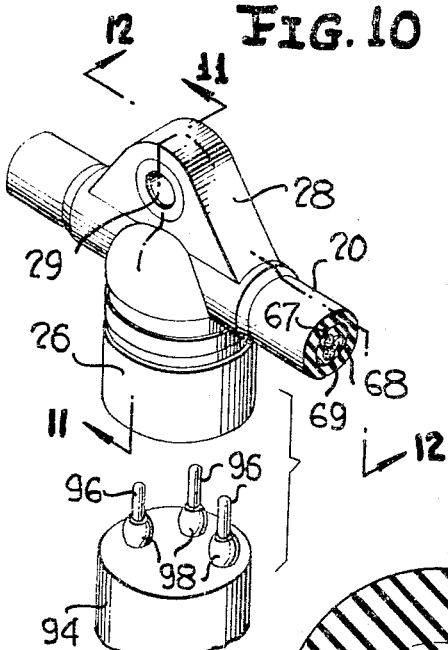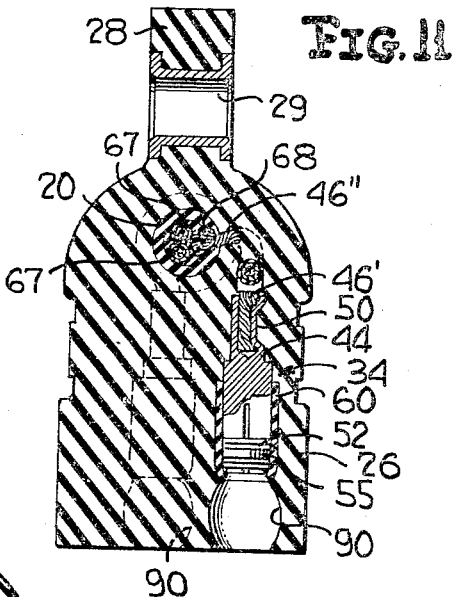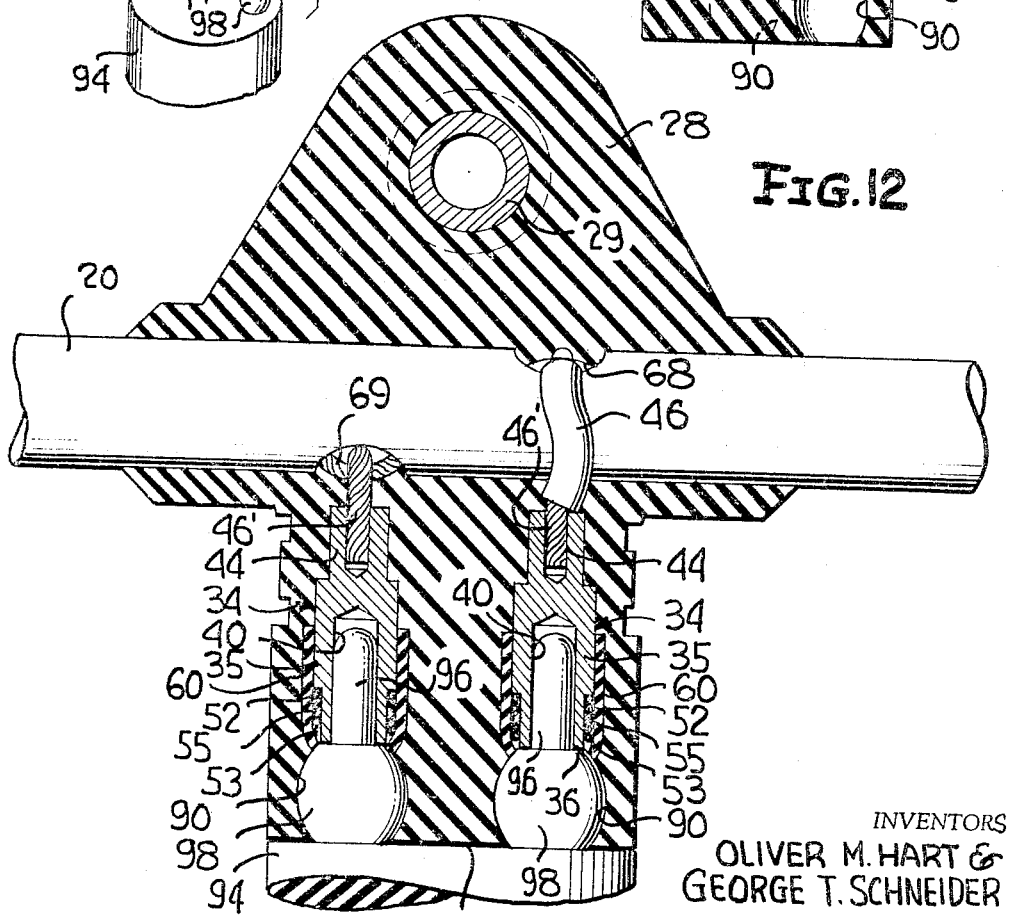

3,325,765
PORTABLE ELECTRICAL POWER DISTRIBUTION APPARATUS AND METHOD OF MANUFACTURE THEREOF
Oliver M. Hart and George T. Schneider, West Cornwall, Conn., assignors to Neoline, Inc., Cornwall Bridge, Conn., a corporation of Connecticut
Filed July 30, 1964, Ser. No. 386,313
1 Claim. (Cl. 339—14)

The present invention relates to new and novel portable electrical power distribution apparatus and method of manufacture thereof, and more particularly to an electrical power distribution arrangement including a plurality of spaced power outlets along an insulated cable.

The present invention relates to an improvement over copending U.S. patent application Ser. No. 181,240, filed Mar. 21, 1962, now U.S. Patent No. 3,153,119 to Oliver M. Hart, issued Oct. 13, 1964, which discloses a so-called "streamline" arrangement of electrical outlets in the form of light sockets. When such light sockets and the like are employed and it is desired to have a power take-off, it would, of course, be necessary to employ an adaptor which fits into a light socket in order to convert the apparatus into a power outlet. This is not a good practice, and it is a particular object of the present invention to eliminate such adaptors. If a tool is plugged into an adaptor type socket in a streamer having light sockets thereon, a tool plugged into the adaptor type socket may draw too much current and blow a fuse. This would, of course, put out the lighting associated with the streamer, and if such streamer were being utilized in the hold of a ship or at night and were the only light supply, a very dangerous situation could be created. Accordingly, this type of an arrangement has been rejected from a practical standpoint.

In addition, when adaptor type sockets are employed, a problem arises when utilizing equipment which must be grounded. This is true even on small tools at the present time, and unfortunately there is a good possibility that the ground may not be effectively made when utilizing an adaptor type socket. This, of course, creates a very hazardous situation when such equipment is ungrounded.

The arrangement of the present invention provides a readily portable electrically insulated and water-proof arrangement for distributing power. Such structure is of special utility for distributing electrical power to areas where temporary power is used as for electric drills, blowers, and the like in such applications as building erection, ship and submarine construction, laying of pipeline, building of power plants, etc.

The method presently employed is to set up several load centers in the heaviest concentrations of usage. This necessitates long leads to electrical devices or only partial use of the load centers where the demand is not to the fullest extent of the load center capabilities.

On the other hand, the arrangement of the present invention enables sufficient distribution of power in a plan configuration or spacing as the individual loads and requirements may occur. The apparatus of the present invention may be employed either in vertical or horizontal direction and by varying the spacing of the power sockets along a cable, power may be economically supplied to any given area. By the selection of the proper number of conductors and by supplying a larger common conductor, a power cable may be constructed so that sockets on individual circuits can be individually controlled or individually used as desired.

Due to the inherent water-proof construction of the over-all power distribution apparatus of the present invention, it is particularly adapted for use in areas where there may be an appreciable amount of moisture.

An important feature of the present invention is the arrangement whereby the power sockets may be spaced at various points along the cable and connected therewith without substantially weakening the cable construction itself and such that the electrical cable remains substantially intact throughout its length to maintain the desired degree of strength.

The electrical contact means employed in the present invention is embedded within a body of insulating material so as to be held in proper operative position and protected in use. Additionally, a hollow chamber is provided in the body of insulating material adjacent the outer end portions of each of the contacts so as to receive a complementary portion of another contact to ensure an effective fluid-tight seal in operation.

A further important feature of the power distribution apparatus of the present invention is the fact that it may readily be repaired. This is a very substantial improvement over multi-outlet molded distribution blocks which have been employed in the prior art and which are generally considered to be unrepairable.

The present invention employs a novel arrangement wherein the electrical contact means embedded within the body of insulating material includes a hollow resilient outer end portion formed by slotting the hollow end portion and disposing resilient coil spring members thereabout to normally press the resilient end portion in an inward direction. A retaining ring is also disposed about this resilient end portion to limit the outer expansion thereof.

A sleeve is tightly fitted about and snugly encloses the slotted end portion of the electrical contact means, this sleeve being of elongated resilient construction and being formed of material which has good electrical insulating characteristics.

The utilization of this sleeve arrangement has a number of advantages in the construction of the present invention. Firstly, this sleeve provides an even better electrical insulating characteristic to the over-all arrangement since the sleeve is formed of material which has very good electrical insulating qualities and which enhances the electrical insulation of the electrical contact means. In addition, this sleeve serves an important function during the method of manufacture of the apparatus.

When the apparatus is being manufactured, the sleeve is first snugly fitted about the slotted resilient end portion of the electrical contact means, and a suitable mandrel is associated with these electrical contact means. The body of insulating material is then molded about the electrical contact means. This sleeve which snugly fits about the resilient end portion of the contact means prevents the molding material from entering the slots in the resilient end portion of the contact means thereby ensuring that the slots remain open and afford the desired degree of resiliency to the contact means.

An object of the present invention is to provide a new and novel portable electrical power distribution apparatus wherein the over-all structure is effectively electrically insulated and water-proof sockets are employed which are well protected during use.

Another object of the invention is to provide portable electrical power distribution apparatus including an insulated electrical cable which is substantially integral throughout its length and which is not substantially weakened and wherein the power outlets may be spaced at any desired interval along the cable.

A further object of the invention is the provision of portable electrical power distribution apparatus which includes a plurality of spaced power distribution sockets and which eliminates the necessity of providing adaptor type sockets and which ensures that a good ground connection will be made with cooperating contact means.

Still another object of the invention is to provide portable electrical power distribution apparatus which can be readily repaired.

Yet another object of the invention is the provision of portable electrical power distribution apparatus including sleeve means about the electrical contact means thereof to provide superior electrical insulating characteristics and further which cooperates in a novel method of manufacture of the apparatus to prevent molding material from running into the slots in the resilient end portions of the contact means.

Other objects and many attendant advantages of the invention will become more apparent when considered in connection with the specification and accompanying drawings, wherein:

FIG. 1 is an elevation partly broken away illustrating a power distribution streamer according to the present invention;

FIG. 2 is an exploded perspective view illustrating the assembly of one of the electrical contact means of the present invention and the manner in which it is associated with an electrical lead;

FIG. 3 illustrates the components shown in FIG. 2 in assembled relationship;

FIG. 4 illustrates the manner of cutting into the cable for locating a conductor;

FIG. 5 illustrates the manner in which a conductor of the cable is bared;

FIG. 6 shows a tool employed for making a space under a conductor for receiving one of the leads;

FIG. 7 shows the manner in which one of the leads is slipped under one of the conductors;

FIG. 8 illustrates the knot employed for tieing each of the leads under an associated conductor;

FIG. 9 illustrates three electrical contact means tied to the conductors of the cable;

FIG. 10 is a top perspective view illustrating the completed power distribution arrangement of the present invention and a cooperating electrical plug;

FIG. 11 is a sectional view taken substantially along line 11—11 of FIG. 10 looking in the direction of the arrows; and FIG. 12 is a sectional view taken substantially along line 12—12 of FIG. 10 looking in the direction of the arrows.

Referring now to the drawings wherein like reference characters designate corresponding parts throughout the several views, there is shown in FIG. 1 a power streamer according to the present invention including a conventional insulated electrical cable 20 having three separate electrical conductors therewithin, the cable having a plug 21 at one end thereof having three separate prongs 22 which are adapted to be inserted within suitable sockets in a complementary connector means.

Three separate spaced outlet means are indicated generally by reference numerals 25, each of these outlet means including a power socket portion 26 which is adapted to be connected with a suitable plug, the socket means including a body of insulating material which is bonded to the cable. These bodies of insulating material also include laterally extending portions 28 having openings 29 therein defined by grommets, these openings being for the purpose of facilitating handling of the apparatus and hanging up of the streamer when desired.

Referring now particularly to FIGS. 2, 3, 11 and 12, the electrical contact means of the present invention are all of identical construction, and a single one of these is indicated by reference numeral 34 in FIGS. 2 and 12, for example, each of these electrical contact means including a main cylindrical body portion 35 including an end portion 36 of reduced outer dimension and having a longitudinally extending cavity 40 formed therewithin, cavity 40 opening through the outer end of the contact means.

The end portion of the contact means including parts 35 and 36 is slotted so as to provide a plurality of longitudinally extending slots 42 as seen most clearly in FIG. 2, these longitudinally extending slots providing the electrical contact means with a certain degree of resilience at the end portion thereof. The contact means is preferably formed of soft brass or similar material which is readily deformed.

An end portion 44 is provided of reduced dimension and is hollow so as to receive the lower bared end 46' of an electrical lead 46. This lower bared end portion of the lead is preferably secured in operative position as by crimping the bared end of the lead in place within the hollow end portion 44, such crimping being indicated by reference numeral 50 on the drawings.

As seen most clearly in FIGS. 2 and 12 a pair of coiled spring members 52 and 53 are provided, and an intermediate annular retaining ring 55 of a suitable metallic substance is also provided.

These elements are assembled on the reduced end portion 36 of the electrical contact member as seen most clearly in FIG. 12, with the retaining ring 55 sandwiched therebetween or intermediate the coiled spring members. With this arrangement, the coil spring members normally urge the slotted resilient end portion of the contact means inwardly so as to be in intimate contact with a cooperating prong, while the retaining ring 55 will positively limit outward expansion of the resilient end portion of the contact means when the prong is inserted therewithin.

An elongated resilient sleeve 60 is provided, this sleeve being formed of a good insulating material and may comprise a pre-cured compound such as natural rubber or plastic which will provide the desired electrical insulating qualities. This sleeve is of such a diameter that it is expanded slightly when moved into the operative position as seen in FIG. 12, and in this position, the sleeve snugly encloses the slotted end portion of the contact means and of course also surrounds members 52, 53 and 55.

Sleeve 60 is mounted in the operative position shown prior to molding the body of insulating material about the contact means, and as mentioned previously, this sleeve serves to prevent the molding material from running into the slots in the contact means during the molding process.

Referring now to FIG. 4, the cable 20 is shown as having three conductors 67, 68 and 69 disposed therewithin, these conductors respectively being the black wire, the white wire and the green wire as these wires are conventionally coded. As seen in FIG. 4, a knife or similar instrument indicated generally by reference numeral 70 is provided, and the blade 71 thereof is utilized to cut through the insulation of the cable, making a partial circumferential cut so as to find the black wire, for example. After the black wire has been found, it is cut into and sufficient insulation cut away so as to expose the black wire as indicated by reference numeral 73 in FIG. 5.

The cutting member or knife has been moved over approximately ¾ of an inch to the right of this point as indicated in FIG. 5 and another circumferential cut as indicated by reference numeral 75 is made angularly removed around the cable for exposing the white wire. This white wire is cut into and the conducter exposed as indicated by reference numeral 76 in FIG. 6.

The cutting means is then moved approximately ¾ of an inch to the left of the original cut and another circumferential cut is made in the cable as indicated by reference numeral 77 in a position disposed angularly in an opposite direction from the original cut as was the cut 75 to thereby find the green wire. The green wire is then cut into to expose the conductors therein as indicated by reference numeral 78 in FIG. 6.

As seen in FIG. 7, an opening is formed under the black wire as indicated by reference numeral 73, a tool indicated generally by reference numeral 80 being utilized for this purpose and having a tapered lower end 81 which is forced under the conductor as shown in FIG. 6. After having formed the opening under the conductor 73 according to the method shown in FIG. 6, the upper bared end 46" of lead 46 is slipped through the opening created by the tool and then tied to the conductor by means of the novel knot illustrated in FIG. 8, the knot being tied in the manner clearly illustrated and indicated by the arrows in this figure. This knot is tightened up and the members firmly connected to one another.

The tool 80 is then employed for making an opening under the other conductors 76 and 78, and the bared end portions of additional leads 46 are slipped thereunder and tied thereto with a knot as illustrated in FIG. 8. In this manner leads are also connected to the white and green conductors within the cable.

Referring now to FIG. 9, the assembly is shown after each of the various leads 46 connected with identical electrical contact means having sleeves 60 associated therewith is connected with the conductors of the cable. As seen in this figure, it will be noted that bodies of solder indicated by reference numerals 85 are placed in contact with the bared ends of the leads and the conductors of the cables where they are tied together with the knot shown in FIG. 8, this body of solder additionally ensuring that a good electrical contact is made and that these components will not pull apart at this point.

After having assembled the components into the relationship shown in FIG. 9, the various components are assembled in a suitable mold and mandrels inserted within the various electrical contact means so as to prevent the entry of molding material into the open end of the contact means. It will be understood that these mandrels will engage the end portions of sleeve 60 so as to prevent the entry of molding material into any of the longitudinal slots in the resilient end portion of the contact means or into the cavity 40 thereof.

The body of insulating material 26 is then molded into place in surrounding relationship to the cable 20 as illustrated most clearly in FIGS. 10, 11 and 12, with the contact means embedded within the body of insulating material in such a manner that each of the contact means is insulated from one another and is recessed into the body so as to be completely protected from damage during use of the apparatus.

The body has formed therein adjacent the outer end portion of each of the electrical contact means a hollow chamber, these chambers each being indicated by reference numeral 90. Each of these chambers is defined by substantially arcuate surfaces and opens to the outer surface 92 of the body of insulating material. These arcuately shaped chambers are of the type illustrated in U.S. Patent 3,125,391, and are adapted to receive correspondingly shaped portions on a cooperating plug means.

As seen in FIGS. 10 and 12, a cooperating plug means is indicated by reference numeral 94 and is provided with three conductors therein. The three conductors within plug 94 are connected with three prongs 96 extending outwardly therefrom which are adapted to be seated snugly within the resilient outer end portions of the contact means 34 previously described.

The base portion of each of the prongs 96 is surrounded by a portion 98 of insulating material, the outer surface of portions 98 being complementary to the inner surface of the chambers 90 formed within body 26. Portions 98 on the plug are adapted to fit snugly within the chambers 90 of the power distribution apparatus of the present invention, and this snug fit between the surfaces is adapted to ensure a fluid-tight seal between the components.

The plug 94 is shown in assembled relationship with respect to the socket means of the present invention in FIG. 12, and as seen in this figure, it will be apparent that not only is a good fluid-tight seal provided, but also a very good electrical connection is provided between the prongs 96 and the resilient end portions of the contact means 34. It is also evident that the power connection can be made or broken in a most simple manner simply by snapping the plug member into position and pulling it out of the socket means when desired.

It is apparent from the foregoing that there is provided according to the present inveniton new and novel portable electrical power distribution apparatus and method of manufacture thereof. The over-all construction of the present invention is well insulated electrically and provides a water-proof arrangement, and further ensures that the electrical contact means are protected from damage regardless of the fact that the apparatus may be subjected to rough use and abuse. The insulated electrical cable maintains its integrity throughout its length and is not substantially weakened, and at the same time the electrical power distribution means may be spaced at any desired intervals along the cable. The power distribution arrangement of the present invention eliminates the necessity of providing any adaptor type sockets, and the equipment is effectively and positively grounded at all times. In addition, the distribution apparatus of the present invention may be readily repaired as required. The sleeve means employed about the resilient slotted end portions of the contact means and which are then molded in place within the body of insulating material provide superior electrical insulating characteristics as compared with an arrangement wherein the body of insulating material might be molded directly about the contact means. In addition, this sleeve serves an important function during the method of manufacture in that it prevents the molding material from falling into the slots provided in the outer end portions of the electrical contact means.

As this invention may be embodied in several forms without departing from the spirit or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by the claim.

We claim:

Portable electrical power distribution apparatus comprising a continuous insulated electrically conductive cable having a plurality of electrical conductors therein, a body of insulating material on said cable and bonded thereto, a plurality of electrical leads embedded within said body, each of said electrical leads being connected with a different one of said electrical conductors within said insulated cable at an intermediate point along the length of the conductor and the cable, said cable having a plurality of partial circumferential cuts formed in the outer portion thereof to provide access to said conductors for connection of said leads thereto, said cuts extending radially inwardly from the outer surface of the cable only a minor portion of the diameter of the cable, said cuts being spaced from one another longitudinally along said cable and also being spaced angularly around the cable from one another such that the electrical cable remains substantially intact throughout the length thereof to maintain the desired degree of strength and without substantially weakening the cable construction while permitting electrical leads to be connected to an intermediate portion of the conductors within the cable, a plurality of separate electrical contact means each of which is connected to a different one of said leads, the improvement wherein each of said contact means including a main contact member having a socket at one end thereof receiving a portion of a lead and being connected thereto, said main contact member having a cavity formed in the opposite end portion thereof, said opposite end portion being slotted longitudinally thereof to form a resilient end portion, said opposite end portion being of reduced outer diameter as compared with the adjacent portion of said main contact member, a pair of coiled spring members disposed in surrounding relationship to said reduced resilient end portion for normally urging said resilient end portion in an inward direction, an annular retaining ring disposed about said reduced resilient end portion and intermediate said spring members, the outer surfaces of said coiled spring members and said retaining ring being substantially flush with the outer surface of the adjacent portion of said main contact member, an elongated resilient sleeve of electrical insulating material disposed in surrounding relationship to the resilient end portion of said contact members and also surrounding said coiled spring members and said retaining ring so as to snugly enclose the entire slotted end portion of the contact member, said body of insulating material having formed therein adjacent the resilient outer end portion of each of said contact members a hollow chamber which opens through the outer surface of the body, said hollow chamber being defined by walls of arcuate configuration.

References Cited

UNITED STATES PATENTS

| | | | |
|---|---|---|---|
| 1,979,485 | 11/1934 | McPartlin et al. | 339—59 |
| 2,260,121 | 10/1941 | Miller | 339—59 |
| 2,742,624 | 4/1956 | Stevens | 339—14 X |
| 3,125,391 | 3/1964 | Hart | 339—60 |
| 3,153,119 | 10/1964 | Hart | 339—14 |

FOREIGN PATENTS

| | | |
|---|---|---|
| 483,579 | 4/1938 | Great Britain. |
| 520,028 | 4/1940 | Great Britain. |
| 750,370 | 6/1956 | Great Britain. |

MARVIN A. CHAMPION, *Primary Examiner.*

P. A. CLIFFORD, *Assistant Examiner.*